July 9, 1940.　　　　F. M. VEATCH　　　　2,207,136
LIQUID SEWAGE DISTRIBUTOR
Filed April 21, 1938　　　3 Sheets-Sheet 3
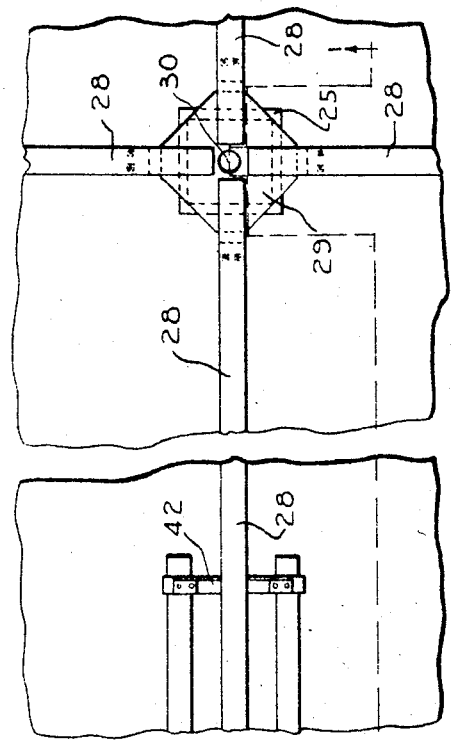
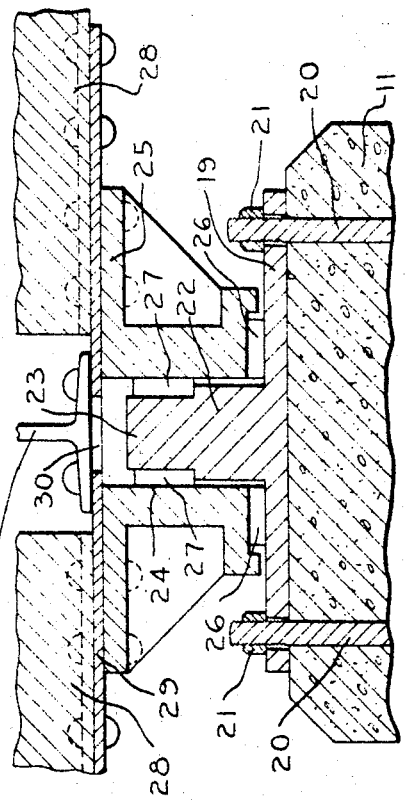
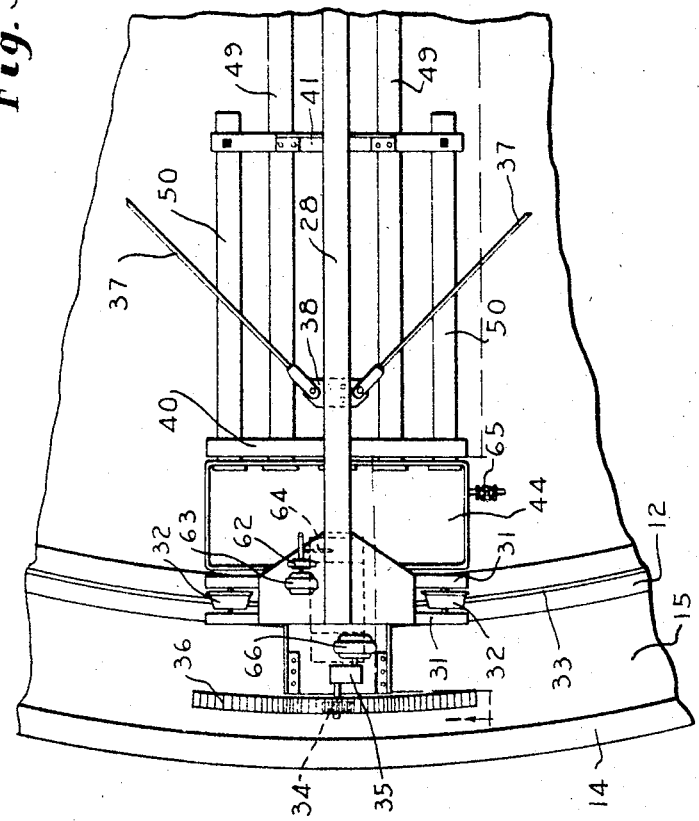
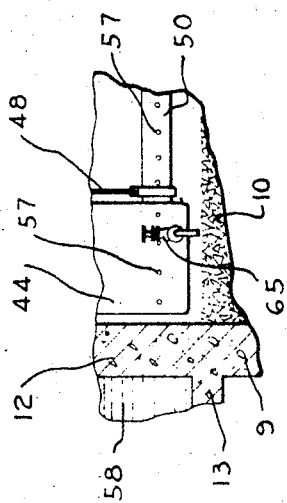
INVENTOR
FRANCIS M. VEATCH
BY Alfred R. Fuchs
ATTORNEY Patented July 9, 1940

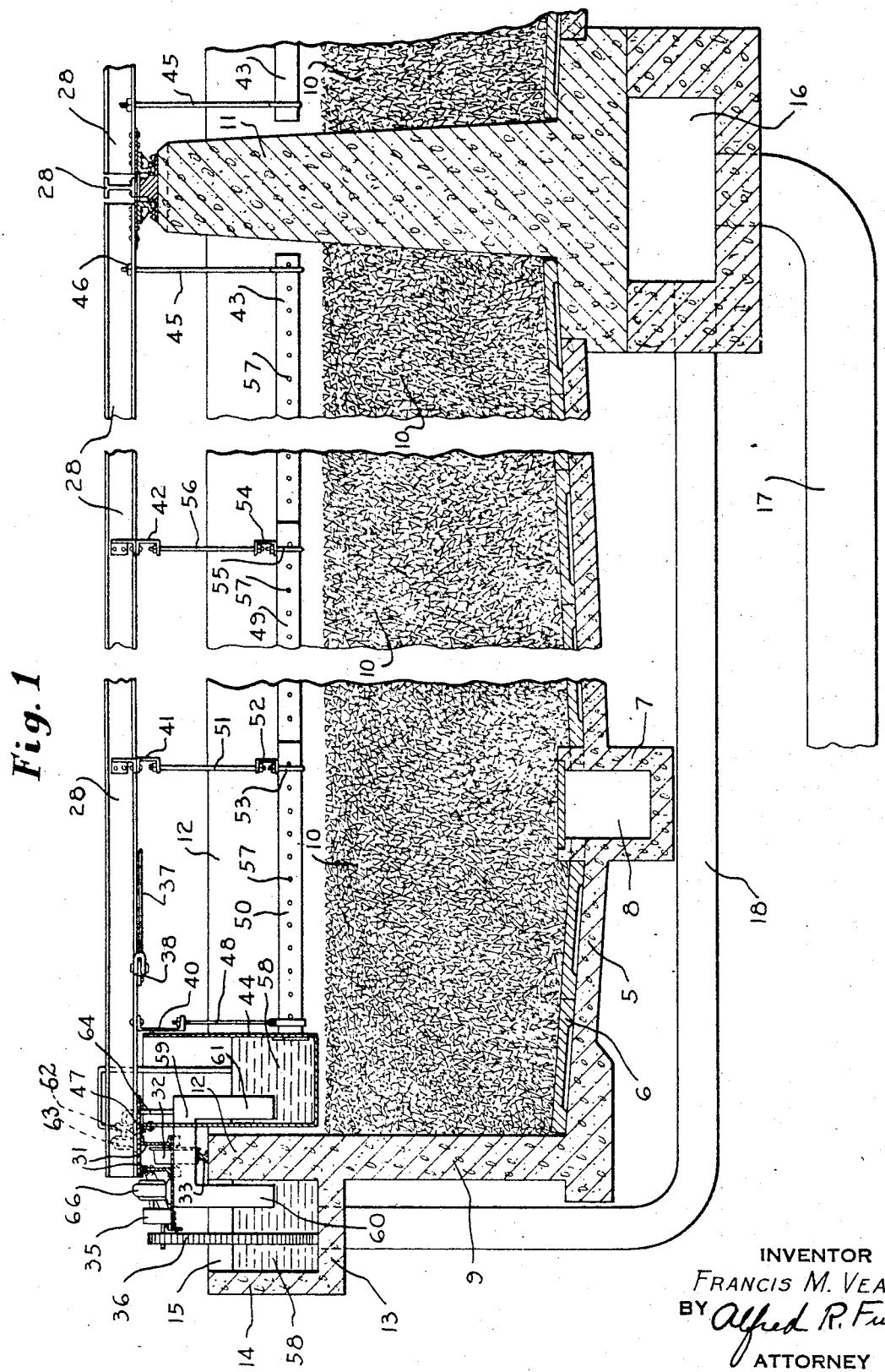

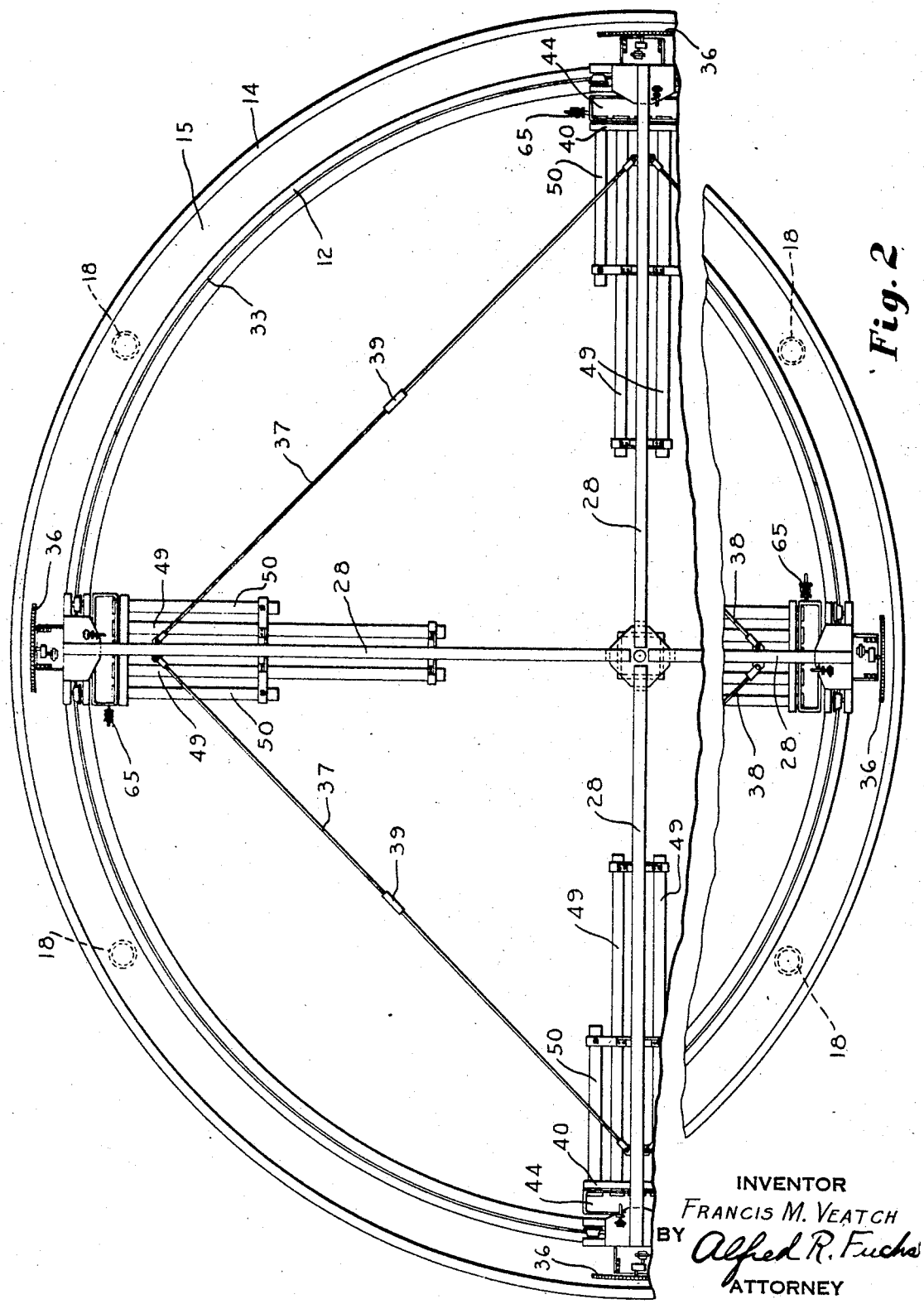

2,207,136

UNITED STATES PATENT OFFICE 2,207,136

LIQUID SEWAGE DISTRIBUTOR

Francis M. Veatch, Kansas City, Mo.

Application April 21, 1938, Serial No. 203,269

9 Claims. (Cl. 210—7)

My invention relates to the distribution of liquids evenly over an area, and more particularly to a liquid sewage distributor for the distribution of sewage over a bed of crushed stone, or other granular material, commonly known as a trickling filter.

In the use of trickling filters for the biological treatment of sewage, the sewage, after preliminary treatment, is applied to the beds of crushed stone, or similar material, in a liquid state, either in the form of a spray from fixed nozzles or in small streams or jets, from moving distributors. In either case, the sewage passes downwardly through the filter bed over the loose filter material in thin films or streams, a certain amount of the organic matter contained in the sewage adhering to the filtering material, and in the course of a short time the surfaces of the particles of stone or other material that form the filter, are covered with a gelatinous film of organic matter, which constitutes a suitable habitat for micro-organisms of a type which have the ability, through their life activities, of changing the organic matter in the sewage from an unstable to a stable form.

It has been common practice to apply the sewage to the filter at an average rate of about two million gallons per acre of filter surface per day, but more recently it has been discovered that this rate of dosage may be greatly exceeded without in any manner interfering with the process. It has been common practice, in the use of circular filter beds, to apply the sewage by means of a device known as a rotary distributor, and of those types in general use, all of which I have knowledge have employed the general principle of receiving the sewage at the center of the bed in a feed well, or similar receiver, and distributing it through two or more radial distribution pipes, or conduits, which are connected to the receiving well at their inner ends and are perforated with holes or fitted with nozzles of various types at various intervals along their lengths, the same being rotated about the central feed well in a suitable manner. Due to the fact that all distribution of the liquid has been from the center of rotation of the distributing members toward the radially outer ends thereof, the distributing of the sewage uniformly over the entire filter area has not been readily accomplished by such distributors.

In all types of distributors over filter beds of the above mentioned character, it is desirable to distribute the sewage as uniformly as possible over the entire filter area. In other words, it is desirable to have every square foot of the filter area near the center of the bed receive the same volume of sewage during a given period of time as any square foot of surface near the periphery of the filter, or at any other location therein. It is one of the principal purposes of my invention to provide such an even or uniform distribution of the sewage in a filter bed by rotary distributing means.

Due to the fact that the mounting of the rotary distributing means in use at the present time for distribution of sewage over filter beds has been at the center of the bed, and due to the fact that the liquid supplied to the distributing means has been supplied from the center of the bed, the area of the filter beds that can be dosed by such rotary distributors has been sharply limited. This is due to the structural and mechanical difficulties incident to the construction and operation of the distributors supported from a central column, and to the hydraulic difficulties involved in distributing the sewage equally over the surface area of the filter, due to the increase of the area and the distance from the source of supply toward the outer peripheral portion of said circular, or similarly shaped, filter area. The area, of course, increases as the square of the distance in an outward direction from the center of the filter, and also the amount of liquid discharged from the perforations, or nozzles, decreases, due to the loss of head, toward the outer ends of the distributing members, where the supply is from the center thereof, as the distance from the source of supply increases.

It is the principal purpose of my invention to supply the sewage to the filter from the periphery of the bed, rather than from its center, and to overcome the hydraulic and geometrical difficulties hereinbefore mentioned, by the provision for multiple distributors of such length and of such arrangement that the surface of the circular filter bed may be covered uniformly, said distributors being so supported and driven that the practical diameter of the circular bed is not limited, due to the above mentioned hydraulic and geometrical difficulties. The distribution is, preferably, obtained in such a manner that the liquid is supplied at or near the outer ends of conduits that extend inwardly from the portion of the distributor adjacent the periphery of the filter bed, and carried inwardly toward the center thereof, so that the greatest amount of liquid is supplied to the bed from each conduit at the outer end thereof, instead of the inner end thereof, gradually decreasing toward said inner end, and so that a larger number of distributing members may be provided at the peripheral portion of the rotary distributing means than at the central portion thereof, the arrangement of distributing conduits being such as to gradually decrease the number thereof from the peripheral portion of the distributing means toward the central portion thereof. Preferably, the liquid that is to be discharged upon, or distributed over, the filter bed, is supplied by means of an annular supply conduit, from which the liquid is carried to receiving members that supply the liquid to the distributing pipes or conduits, said receiving members and conduits being part of the rotary system, and means being provided entering the annular trough-like member for transferring the liquid from said trough-like member to the receiving means on the rotary distributor.

Other objects and advantages of my invention will appear as the description of the drawings proceeds. I desire to have it understood, however, that I do not intend to limit myself to the particular details shown or described, except as defined in the claims.

In the drawings:

Fig. 1 is a vertical sectional view, partly broken away, through a sewage filter, showing my improved distributing means applied thereto, taken substantially on the line 1—1 of Fig. 3.

Fig. 2 is a broken plan view of a circular sewage filter, showing my improved distributing means applied thereto.

Fig. 3 is a fragmentary top plan view of my improved distributing means, a portion of the filter being also shown.

Fig. 4 is a fragmentary sectional view on an enlarged scale, of the central rotary support for the distributing means, and Fig. 5 is a fragmentary view partly in section and partly in elevation.

Referring in detail to the drawings, a filter bed is shown, which may be of any desired construction, one form being shown by way of example, but any filtering bed adapted to having the liquid supplied thereto by rotary distributing means being adapted to have my invention applied thereto. Said filter bed is shown as having a sloping floor 5, which may be made of concrete or similar material, upon which the tiles 6 are mounted, said bottom being provided with sumps 7 providing discharge conduits 8 for the liquid after treatment. A substantially vertical side wall 9 is provided on the filter bed, and said bed is filled with loose filtering material, such as crushed rock, 10. Preferably, a central pedestal, or support, 11 of concrete or other suitable material, is provided in the filter bed for the central support of the rotary distributing means constituting my invention.

In adapting a filter bed to my invention it is necessary to provide a trough or channel around the periphery of said filter bed, this being, preferably, accomplished by providing an upward extension 12 on the side wall 9, extending above the top of the filter bed, and by providing a bottom wall 13 and a wall 14, spaced from the wall portion 12, to thus provide an annular trough or channel surrounding the filter bed, in the embodiment shown, and located above the loose material of said filter bed at an elevation such that the liquid level therein will be sufficient for feeding purposes. Any suitable means for supplying the liquid sewage to the annular channel, or trough, 15 may be provided, but preferably, a central receiving chamber 16 is provided to which the supply conduit 17 leads, and from which the branch conduits 18 extend to a plurality of points within the channel 15.

Referring to Fig. 4, it will be noted that the top portion of the pedestal 11 is provided with a suitable base plate 19, which is secured in any suitable manner to the pedestal 11, as by means of the screw-threaded rod-like members 20 and nuts 21. Said base plate 19, preferably, has an upward extension 22 terminating in a reduced end portion 23 mounted within a central opening 24 in a central support 25 for the arms of the rotating distributing means, to be described below. Any suitable means may be provided for rotatively mounting the member 25 on the base plate 19, such as the roller bearings 26 and 27. While a specific form of rotative mounting for the rotary distributing means is shown in the drawings, it is, of course, to be understood that this may be varied as desired, it being only important that a mounting of sufficient strength, and providing as little resistance to rotation of the rotary distributing means as possible, is provided.

A plurality of arms 28 are mounted on the central rotary supporting member 25, said arms 28 being shown as being channel members, which are riveted to the member 25, although any beam or truss-like member may be utilized for the purpose of providing arms for supporting the spraying means. The number of arms provided may be varied, but, preferably, at least four are utilized, as shown in the drawings. Said arms may be braced by any suitable means at the center thereof, such as the gusset plate 29, which gusset plate may be provided with a central opening 30 to provide access to the bearing for lubrication purposes, or otherwise.

The outer ends of the arms 28 are, preferably, supported on wheels, which are mounted on brackets 31, depending from the arms 28 near their outer ends, being mounted on suitable axles carried by said brackets 31. The wheels 32 supporting said arms 28 are, preferably, flanged in a similar manner to a railway car wheel and operate on a rail 33 that follows a path around the filter bed and is mounted, preferably, on the top of the extension 12 of the wall 9. While the discharge of the liquid from the distributing pipes, or conduits, can be utilized for rotating the arms 28, preferably, means is provided for rotating said arms by means of outside power, such as the electric motor 66, which drives a sprocket 34 through a reduction gearing 35, said sprocket meshing with a chain 36 resting in the channel or annular trough 15, the rotation of the sprocket 34 causing the picking up of the chain 36 as said sprocket travels along said chain 36 and carries the arm 28 in the desired direction. The arms 28 rotate together as a rotary distributing unit and are, preferably, braced and held in proper spaced relation by means of the tie rods 37 that are connected to the brackets 38 on the arms 28, extending between the adjacent arms and being drawn tight in any suitable manner, as by means of the turnbuckles 39.

Each of the arms 28 is provided with a plurality of transversely extending channel members 40, 41 and 42, secured in fixed position on said arms 28 in any desired manner and extending substantially perpendicularly to said arms 28. Said channel members serve as transverse supports for the distributing conduits comprising, preferably, perforated pipes, one of said conduits 43 extending substantially the full length of the arm 28 from a liquid receiving member or header 44 to adjacent the central supporting pedestal 11. The inner end of the distributing conduit 43 is, of course, closed and is supported near its closed end by means of a hanger 45, secured to the arm 28 in any desired manner, such as by passing the same through a suitable opening in the lower flange on the member 28, and securing the same in position by means of a nut 46 engaging the threaded end of the hanger 45, as shown in Fig. 1. The liquid receiving member, or header, 44 is supported from the channel member 40 by means of the plurality of conduits secured thereto, which are supported by the channel member 40, and also by means of any suitable bracket, such as the angle 47, secured to the arm 28. The channel member 40 is provided with a plurality of hanger members 48 supporting the distributing conduit 43, the distributing conduits 49 and the distributing conduits 50, said conduits all extending into the header member 44 and being secured in liquid-tight relation to the wall thereof, so that liquid is supplied to the outer ends of said conduits from said receiving member, or header member, 44.

A plurality of tie rods 51 extend from the bracket 41 to a bracket 52 that serves to support the plurality of conduits in properly spaced relation, said conduits being secured to the channel member 52 by any suitable means, such as the pipe clamps 53. The conduits 49 and the conduit 43 are similarly supported and spaced from each other by means of the channel member 54 and the clamps 55, said channel member 54 being supported from the channel member 42 by means of the tie rods 56.

It will be noted upon reference to Figs. 1, 2 and 3, that the conduits 49 are considerably shorter than the conduit 43, and that the conduits 50 are considerably shorter than the conduits 49. The relative lengths and numbers of the conduits may be varied as will be found necessary to get the even distribution of the liquid over the surface of the filter bed, the important thing being that the number of conduits be multiplied toward the periphery of the bed, or in other words, toward the outer ends of the arms 28. It will also be noted that all of the conduits are provided with perforations 57, or discharge openings, on only one side thereof, and that being the same side of all said conduits relative to the direction of rotation of the device, the discharge of the liquid thus aiding in the rotation of the rotary distributor. It is, of course, to be understood that the inner ends of the conduits 49 and 50 are also closed, and that drain valves 65 may be provided for the receivers 44. Also it is to be understood that the conduits may have any spacing and arrangement of discharge openings that may be desired to obtain the uniform distribution of liquid over the bed, and that the proper number and size of openings 57 are provided in the receivers 44 to obtain the desired distribution of liquid over the portion of the filter over which the receivers 44 pass during rotation of the arms.

Any suitable means may be provided for transferring the liquid 58 from the annular channel, or trough, 15, to the headers, or receiving members, 44 on the arms 28. Siphons 59 are shown, each of which has a leg 60 extending into the trough 15 below the level of the liquid 58, and a leg 61 extending into the header 44 below the level of the liquid 58 therein. Means may be provided for starting the siphon, this being, preferably, done by means of a rotary pump 62 driven by means of a small electric motor 63, said pump 62 being connected with the transverse leg of each siphon 59 by means of the suction pipe 64.

In operation, the sewage enters the filter through the conduit 17 and branch conduits 18, passing from the conduits 18 into the conduit, or peripheral flume, 15. The trough, or flume, 15 is designed with its cross section large enough to reduce the velocity head of the sewage stream to a negligible quantity. From the circumferential conduit 15 the sewage is siphoned by means of a plurality of siphons 59 into the header boxes, or receivers, 44, provided on each of the arms and connected with the distributing pipes 43, 49 and 50. The distributing pipes are provided with holes, or openings, of such size and number as may be required to distribute the sewage flow as desired, the length and arrangement of pipes being such that substantially the same amount of sewage per square foot of filter area is supplied over the entire filter area from the center thereof to the periphery thereof. As the arms 28 rotate, the sewage is distributed over the filter bed in a radially extending zone, which travels around the center of the filter. Thus each area of the filter will be dosed four times, with four arms 28, for each rotation of the apparatus, the number of dosings per rotation being, of course, dependent upon the number of arms provided. The number of arms can be varied in accordance with the size of the filter and the speed of rotation thereof, so as to obtain the number of dosings in a given period of time, that may be found desirable in practice. The sewage so distributed trickles through the filter bed of loose material in the usual manner.

What I claim is:

1. Rotary means for distributing liquid over a circular area comprising a plurality of arms extending from the center of rotation of said means, and conduits provided with liquid discharging means mounted on said arms, and means for supplying liquid to said conduits at points remote from the center of rotation thereof, comprising a supply channel surrounding said area, there being a plurality of said conduits on each of said arms provided with discharging means arranged to discharge liquid over an area of greater width adjacent the outer end of each arm than at the inner end thereof.

2. Rotary means for distributing liquid over a circular area comprising a support at substantially the center of said area, a member mounted for rotation on said support, a plurality of arms extending substantially radially outwardly from said member, and conduits provided with liquid distributing means throughout their length mounted on each of said arms, and means for supplying liquid to each of said conduits at the outer ends thereof, said conduits varying in length to provide means on each arm distributing liquid over an area of greater width adjacent its outer end than nearer the inner end thereof.

3. Rotary means for distributing liquid over a circular area comprising a support at substantially the center of said area, a member mounted for rotation on said support, a plurality of arms extending substantially radially outwardly from said member, and a plurality of conduits having liquid distributing means throughout their length mounted on each of said arms, and means for supplying liquid to each of said conduits adjacent the outer ends thereof, said conduits comprising a conduit extending substantially the full length of said arm, and shorter conduits extending inwardly from the outer end of said arm, said shorter conduits being stepped in length to provide zones on each arm distributing liquid over areas of varying widths greatest adjacent the outer ends of said arms.

4. Rotary means for distributing liquid over a circular area comprising a support at substantially the center of said area, a member mounted for rotation on said support, a plurality of arms extending substantially radially outwardly from said member, means for supporting the outer ends of said arms for rotation about said center support, a liquid receiver mounted on each of said arms near its outer end, a plurality of conduits having perforated portions mounted side by side on each of said arms and each having its outer end connected with said receiver, an annular supply channel surrounding said area, and means for transferring liquid from said channel to said receivers.

5. The combination with a substantially circular filter bed, of rotary liquid distributing means comprising a support at substantially the center of said area, a member mounted for rotation on said support, a plurality of arms extending substantially radially outwardly from said member, means for supporting the outer ends of said arms for rotation about said center support, a liquid receiver mounted on each of said arms near its outer end, a plurality of liquid distributing members on each of said arms having their outer ends connected with said receiver and each being provided with spaced liquid discharging means, said distributing means being arranged so as to discharge liquid over an area of greater width adjacent the outer end of each arm than at the inner end thereof, an annular supply channel surrounding said area, and means for transferring liquid from said channel to said receivers, comprisig siphons carried by said arms and each having the legs thereof extending into said channel and one of said receivers.

6. The combination with a substantially circular filter bed, of rotary liquid distributing means comprising a support at substantially the center of said bed, a member mounted for rotation on said support, a plurality of arms extending substantially radially outwardly from said member, means for supporting the outer ends of said arms for rotation about said center support, liquid receivers mounted on said arms near the outer ends thereof, a plurality of perforated conduits on each of said arms extending inwardly from and communicating at their outer ends with a receiver, an annular supply channel surrounding said filter bed, and means for transferring liquid from said channel to said receivers.

7. The combination with a substantially circular filter bed, of rotary liquid distributing means comprising a support at substantially the center of said bed, a member mounted for rotation on said support, a plurality of arms extending substantially radially outwardly from said member, means for supporting the outer ends of said arms for rotation about said center support, liquid receivers mounted on said arms near the outer ends thereof, a plurality of perforated conduits on each of said arms extending inwardly from and communicating at their outer ends with a receiver, an annular supply channel surrounding said filter bed, and means for transferring liquid from said channel to said receivers, said perforated conduits extending from said receivers varying distances inwardly toward the center of said bed.

8. The combination with a substantially circular filter bed, of rotary liquid distributing means comprising a support at substantially the center of said bed, a member mounted for rotation on said support, a plurality of arms extending substantially radially outwardly from said member, means for supporting the outer ends of said arms for rotation about said center support, liquid receivers mounted on said arms near the outer ends thereof, a plurality of perforated conduits on each of said arms extending inwardly from and communicating at their outer ends with a receiver, an annular supply channel surrounding said filter bed, and means for transferring liquid from said channel to said receivers, each of said arms having a perforated conduit extending from the liquid receiver on said arm to adjacent the center of rotation of said distributing means and conduits extending from the liquid receiver only part of the way toward center of rotation of said distributing means.

9. Rotary means for distributing liquid over a circular area comprising means for mounting said distributing means for rotation about substantially the center of said area, said distributing means comprising a plurality of perforated conduits extending from substantially the periphery of said distributing means to substantially the center thereof and perforated conduits extending from substantially the periphery of said distributing means only a portion of the distance to the center of said area, and means for supplying liquid to said conduits at the outer ends thereof.

FRANCIS M. VEATCH.